Sept. 8, 1964
R. F. JONES ETAL
3,147,866
ACCESSORY TRAY
Filed Sept. 26, 1962
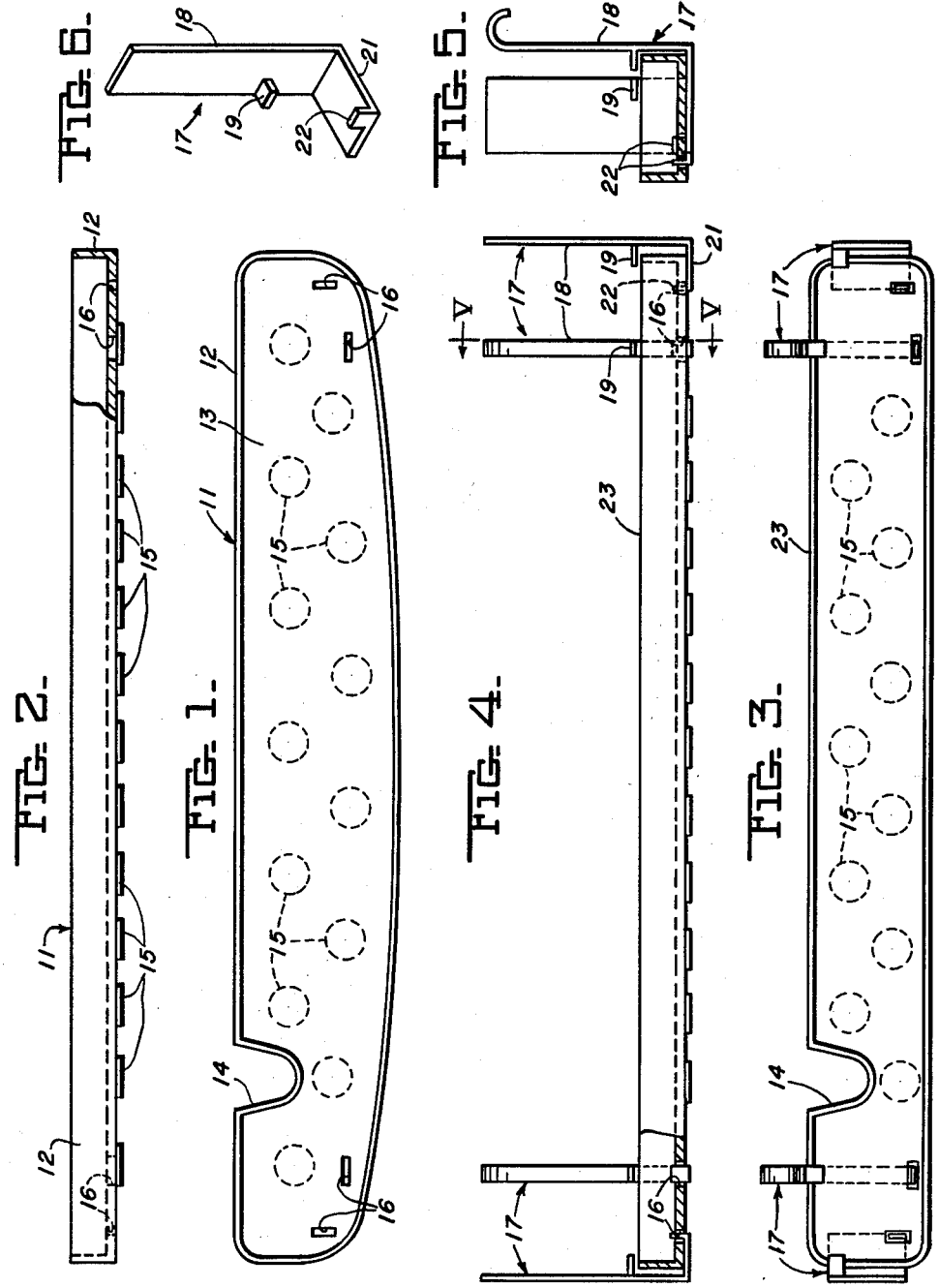
INVENTORS.
ROY F. JONES and
JOHN E. FRAZIER
By
Christy, Parmelee, & Strickland
Attorneys

United States Patent Office 3,147,866
Patented Sept. 8, 1964

3,147,866
ACCESSORY TRAY
Roy F. Jones, 49 Old Elwood Park, and John E. Frazier, 36 Morgan Ave., both of Washington, Pa.
Filed Sept. 26, 1962, Ser. No. 226,345
1 Claim. (Cl. 211—126)

This invention relates to a tray for accessories and more particularly to a tray adapted for use on automobile dashes and seats.

In vehicles having a limited amount of open space available on which articles may be placed as opposed to gloved compartments, a problem of inconvenience is often presented, especially in the sports cars and compact models of today. For example, when eating at drive-in restaurants the food to be served within the car must be passed from a serving tray attached generally to the car doors for the reason that there is insufficient shelf space provided in the automobile for holding the articles such as cups and packaged foods. Further, it is desirous when motoring for any distance to place sun glasses, road maps, cleaning tissues, and the like within reach of the occupants of the car without the necessity of opening compartments which may be located within the dash structure or inbetween the front seats of sports cars.

It is an object of the present invention to provide a tray readily available to occupants of a vehicle.

Another object is to provide a shelf on which may be retained articles for use by occupants of a vehicle with the tray having a structure which is devoid of pointed edges for safety.

Another object is to provide a tray with magnets for mounting of the tray on the metallic dash of an automobile.

A further object is the provision of a tray which is supported in a non-tiltable position for the retention of articles therein.

Other objects and many of the attendant advantages of this invention will become more readily apparent when read in conjunction with the appended drawings, which illustrate a preferred embodiment, wherein:

FIG. 1 is a plan view of the tray designed for retention on an automobile dash;

FIG. 2 is a front elevational view of the shelf or tray;

FIG. 3 is a plan view of the shelf with hangers or straps for attachment of the tray to the automobile seats or under the dash;

FIG. 4 is a front elevation of the tray with the hangers in position for supporting the tray;

FIG. 5 is a sectional view along line V—V of FIG. 4; and

FIG. 6 is a perspective view of the tray end hangers.

Referring now to the drawings, FIG. 1 represents a shelf 11 attached for placement on an automobile dash. A continuous side wall 12 is fixed to the bottom 13 of the tray. The bottom of the tray is provided with a cut-out portion 14 of a size to receive the steering post, not shown, of an automobile. This feature may be eliminated when the tray is not of a length to span the dash from one side to the other.

The side wall 12 is curved to round the corners of the bottom 13 of the tray to avoid any sharp corners which would be a safety hazard in the event of an accident. The tray 11 shown in FIGS. 1 and 2 may be supported removably on the dash of an automobile by means of a plurality of magnets 15 disposed in a random pattern on the bottom surface of the tray and fixed thereto by suitable means such as glue.

The tray disclosed in FIGS. 1 and 2 is provided with spaced slots 16 extending through the bottom 13 for a purpose which is shown in FIGS. 3, 4 and 5. In these figures, hangers 17 are shown to include a central straight portion 18 with a flange 19 extending from the portion 18, and a leg portion 21 is formed integral with the portion 18 and turned upwardly at its end to form a lip 22 which is inserted slideably within a slot 16 through the bottom 13 of the tray 11. The flange 19 is spaced vertically above the leg 21 a distance greater than the height of the side wall 12 of the tray 11 such that the tray may receive the lips 22 through the slots 16 and have its side wall 12 disposed beneath the hanger flanges 19, the clearance between the top edges 23 of the tray side wall 12 and the flanges 19 being sufficient to allow the tray to be manipulated for insertion of the lips 22 within the slots 16 while maintaining the hangers in a horizontally fixed and spaced relation as shown in FIGS. 3 and 4.

Referring to FIG. 5, the tray 11 is shown in cross-section with a hanger 17 installed in position to prevent the tray from tilting about its longitudinal and transverse axes; i.e., the flange 19 extends over the top edge 23 of one side of the tray with the lip 22 being passed through a slot 16 at a point horizontally and vertically removed from the position of the flange 19 of the hanger. The hanger is bent as at 24 at its upper end so as to provide a means which the hanger upper end may pass over the back of an automobile seat, for example, whereupon the hanger 17 will hold the tray 11 supported below the top of the seat. In this fashion, a convenient shelf may be placed removably over the backs of the front automobile seats with the tray 11 disposed to the rear of the front seats and depending toward the floor of the automobile.

The hanger 17 may be terminated at its upper end of the straight portion 18, omitting the bend 24 of the hanger such that the hanger is of a block L-shape in cross section. The straight portion 18 is fixed to suitable support members beneath the dash of an automobile, for example, by suitable means such as fasteners, not shown. In the illustrations described, the shelf 11 is supported by two end hangers and two longitudinally spaced hangers 17. Of course, the number of hangers utilized for the support of the tray 11 is optional and will depend on the nature of the structure to which the trays are attached. The magnets 15 shown fixed to the botom 13 of the tray 11 may be omitted in the event the hangers 17 solely may support the tray in a non-tiltable position, and when the magnets 15 are used the tray will normally not require the use of any hangers, the magnets being strong enough to firmly attach the trays to a metallic surface.

It is manifest that the above-described embodiment of the invention is merely illustrative and that numerous modifications may be made within the spirit and scope of the invention.

What is claimed is:

A tray and hangers therefor comprising a shelf member with a peripheral flange thereabout and of a length greater than its width so that it may be carried on the dash of a motor vehicle when not suspended from the hangers, the shelf having spaced slots in the bottom thereof, and a pair of hangers each of generally L-shaped form having only a vertical shank and having a horizontal ledge at the lower end of the shank, which ledge extends under the tray, the ledge having an integral upstanding tongue near the free end thereof fitted into one of said slots whereby the tray is supported on the ledges of the hangers and is locked against shifting movement by the tongues being entered in the slots in the tray, the shank of each bracket having a laterally-projecting flange located above said ledge extending over the top edge of the peripheral flange of the shelf to restrain the tray from tilting when it is positioned on the hangers.

References Cited in the file of this patent

UNITED STATES PATENTS

| | | |
|---|---|---|
| 560,884 | Anderson | May 26, 1896 |
| 1,354,270 | Wood | Sept. 28, 1920 |
| 1,610,014 | Koch | Dec. 7, 1926 |
| 2,062,742 | Davis | Dec. 1, 1936 |
| 2,217,514 | Henry | Oct. 8, 1940 |
| 2,499,103 | Love | Feb. 28, 1950 |
| 2,628,140 | Bunce | Feb. 10, 1953 |
| 2,796,068 | Healy | June 18, 1957 |
| 2,931,489 | Farnholtz | Apr. 5, 1960 |

FOREIGN PATENTS

| | | |
|---|---|---|
| 878,426 | Great Britain | Sept. 27, 1961 |